Feb. 22, 1966     L. A. FINZI ETAL     3,237,001

COMPARATOR

Filed Dec. 18, 1961

INVENTORS
LEO A. FINZI
ABRAHIM LAVI

BY Francis V. Giolma

ATTORNEY

United States Patent Office 3,237,001
Patented Feb. 22, 1966

3,237,001
COMPARATOR
Leo A. Finzi, Irwin, and Abraham Lavi, Pittsburgh, Pa., assignors to International Business Machines Corporation, New York, N.Y., a corporation of New York
Filed Dec. 18, 1961, Ser. No. 160,205
5 Claims. (Cl. 235—177)

This invention relates generally to comparators and it has reference in particular to a magnetic voltage comparator.

Generally stated, it is an object of this invention to provide a simple and effective voltage comparator that is inexpensive to build and is reliable in operation.

More specifically, it is an object of this invention to provide for storing an indication of one polarity value of a voltage at one instant, and for comparing it with an opposite polarity value of the voltage at a later instant.

It is also an object of this invention to provide for storing an indication of one half cycle of an alternating current voltage, and for unstoring such indication in response to the following half cycle so as to compare it with the following half cycle.

Yet another object of this invention is to provide for resetting a saturable core with one half cycle of an alternating voltage and for setting it with the next half cycle so as to compare both half cycles.

Another object of this invention is to continuously sample a variable quantity alternating about zero and having an arbitrary waveform, to obtain an output proportional to the difference of the time integrals of the variable in consecutive alternations.

It is also an important object of this invention to provide for continuous comparison of successive half cycles of an alternating voltage by using saturable cores energized alternately by successive half cycles of an alternating voltage and reset on the following half cycles.

In practicing the invention in accordance with one of its embodiments, saturable cores are reset to store indications of the values of opposite half cycles of an alternating voltage. A transformer is utilized in conjunction with diodes to set the cores and furnish a voltage for comparison with the reset output so as to provide a continuous comparison between successive half cycles.

The foregoing and other objects, features and advantages of the invention will be apparent from the following more particular description of a preferred embodiment of the invention as illustrated in the accompanying drawings.

Figure 1:
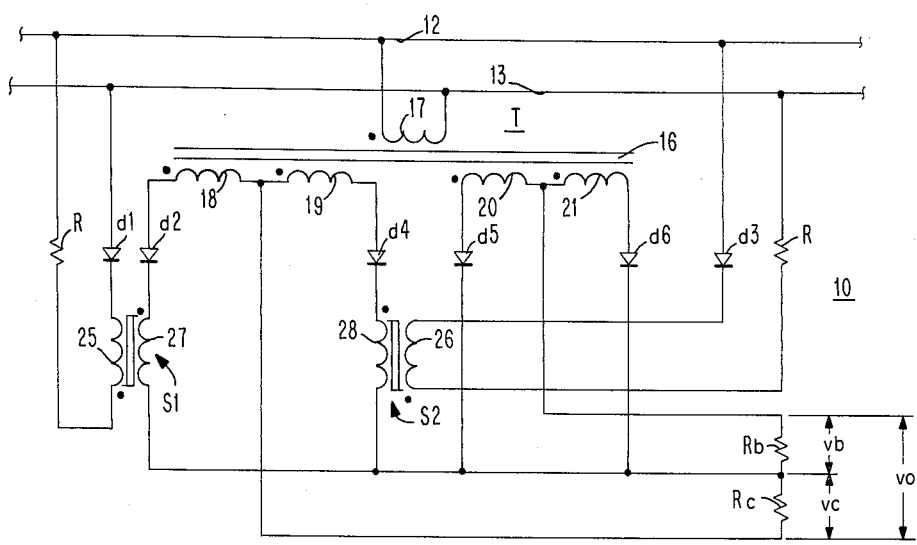
FIG. 1 is a schematic diagram of a comparator embodying the invention in one of its forms.

Referring to FIG. 1 of the drawings, the reference numeral 10 denotes generally a comparator for comparing half cycles of an alternating voltage applied to conductors 12 and 13 which may be connected to a source the voltage of which is to be checked. The reference character T designates generally a transformer of the usual type having a nonsaturating core 16 with a primary winding 17 and center tapped secondary windings 18–19 and 20–21, respectively. If the number of turns in primary winding 17 is considered as $Na$ and the number of turns in each of the secondary windings 18–19 is considered to be $Nc$ while the number of turns in each of the windings 20–21 is considered to be $Nb$, then the following relationship should be maintained. $Nc = kNa$ and $Nb = (k-1)Na$ where $k$ is larger than unity. The reference numeral characters S1 and S2 each designate square loop magnetic cores such as 50—50 NiFe grain oriented alloy, or reset windings 25 and 26 of N turns each connected to the conductors 12 and 13 through diodes $d1$ and $d3$ and current limiting resistors R, in opposite senses. The cores S1 and S2 are also provided with secondary or gate windings 27 and 28 also having N turns. The secondary windings 20 and 21 are each connected across a portion $Rb$ of a voltage divider through diodes $d5$ and $d6$, respectively, so as to apply an output voltage across the resistor $Rb$ on opposite half cycles of the source voltage. The secondary windings 27 and 28 of the square loop cores S1 and S2 are connected through diodes $d2$ and $d4$ in series with the sections 18 and 19, respectively, of the transformer T to the other half $Rc$ of the voltage divider so as to apply signals thereacross on opposite half cycles of the source polarity.

Figure 3:
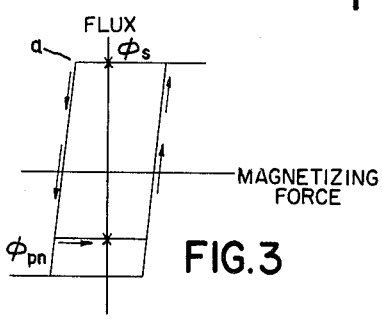
FIG. 3 shows a typical hysteresis curve for one of the saturable rectangular loop material cores S1, S2 of FIG. 1.

Consider a negative half cycle of the voltage $v$ of the conductors 12 and 13, and suppose that the flux of the core of the reactor S1 is as shown by the curve $a$ in FIG. 3 at positive saturation $\phi s$ at the beginning of this half cycle called $(n-1)$th in the following. From then on the rectifier $d1$ conducts while the rectifier $d2$ blocks, and the flux of core S1 is reset from positive saturation $\phi s$ in the direction of the arrows to some value $\phi pn$ proportional to the volt-second value of the $n-1$th half cycle. At the beginning of the $n$th half cycle, the core flux is at the negative value $\phi pn$. The swing of the flux linkages $N(\phi pn - \phi s)$ equals the time integral of $v$ over the $(n-1)$th half cycle.

In the following or $n$th half cycle, the rectifier $d2$ conducts. The core flux of the reactor S1 rises now in the direction of the arrows from the negative valve $\phi pn$, reaching a positive saturation $+\phi s$ at some time before the end of the half cycle. Hence the volt time integral of the ohmic drop across resistor $Rc$ in this half cycle equals the difference between the integral of $kv$ over this half cycle and the integral of $v$ over the preceding half cycle.

Similarly the flux of the reactor S2 is reset under the action of the voltage $v$ during $n$th half cycle and rises to saturation under the action of $kv$ during the $(n+1)$th half cycle. The volt time integral of the ohmic drop across the resistor $Rc$ over the $(n+1)$th half cycle equals the difference between the integral of $kv$ over this half cycle and the integral of $v$ over the previous one, etc. On the other hand, the half cyclic time integral of the ohmic drop across the resistor $Rb$ during the $n$th half cycle equals the half cyclic integral of the voltage $(k-1)v$ over the same $n$th half cycle. In conclusion, the half cyclic integrals of the voltage $vo$ across the two interconnected resistors $Rb$ and $Rc$ over the $n$th half cycle is the difference of the time integrals of the voltage $v$ over the $(n-1)$th half cycles.

Figure 2:
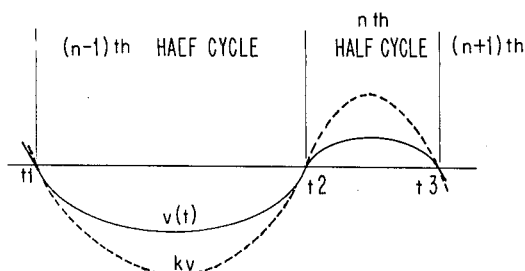
FIG. 2 is a representation of waveforms, successive half cycles of which are being compared.

The above statements are valid quite generally even if the durations of the subsequent half cycles are not equal as shown in FIG. 2 where $t2-t1$ is not equal to $t3-t2$. If the half cycles had uniform duration, the results could be expressed more simply by saying that the average value of the voltage across $Rc$ and $Rb$ is at any half cycle the difference between the rectified values of the average voltage $v$ in that half cycle and in the preceding one.

A basic feature of the device is one in which the resetting action of the voltage $v$ upon the core flux of the reactor is integrated over a half cycle and stored, and is read out and compared in the subsequent half cycle. The choice of the ratio of transformation $k$ is dictated by the presumed range of variation of the half cyclic intervals so as to insure that saturation of the one or the other reactors is reached within each half cycle even if that half cyclic interval is smaller than in the preceding one. Referring to FIG. 2, a mathematical analysis is as follows:

($n-1$)th half cycle core 1 resets $$N(\phi_{pn}-\phi_s) = \int_{t1}^{t2} v\,dt$$

$n$th half cycle core 1 gates $$N(\phi_s-\phi_{pn}) = \int_{t2}^{t3} kv\,dt - \int_{t2}^{t3} Rc i_c\,dt$$

Hence $$\int_{t2}^{t3} Rc i_c\,dt = \int_{t2}^{t3} kv\,dt - \left|\int_{t1}^{t2} v\,dt\right|$$

Also $$\int_{t2}^{t3} Rb i_b\,dt = \int_{t2}^{t3} (k-1)v\,dt$$

In conclusion $$\int_{t2}^{t3} v_o\,dt = \int_{t2}^{t3} v\,dt - \left|\int_{t1}^{t2} v\,dt\right|$$

While the invention has been particularly shown and described with reference to a preferred embodiment thereof, it will be understood by those skilled in the art that various changes in form and details may be made therein without departing from the spirit and scope of the invention.

What is claimed is:

1. In a comparator for successive half cycles of an alternating voltage,
   (a) means for storing an indication of the value of one half cycle of the voltage,
   (b) means responsive to a successive half cycle for unstoring said indications,
   (c) and circuit means for comparing the unstored value with the half cycle unstoring it.

2. A comparator for successive half cycles of an alternating voltage source comprising,
   (a) a saturable core having a reset winding energized on one half cycle from the source, and having a set winding,
   (b) transformer means having one winding connected to the source and having a plurality of other windings,
   (c) circuit means including a voltage divider having two portions,
   (d) circuit means including a rectifier connecting one of the transformer windings to the set winding and to one portion of the voltage divider,
   (e) and other circuit means connecting another winding of the transformer to the other portion of the divider in opposed relation.

3. A comparator for an alternating voltage comprising,
   (a) a saturable core having set and reset windings,
   (b) diode means connecting the reset winding to the source for energization in one sense,
   (c) a transformer having a primary winding connected to the source and a pair of secondary windings,
   (d) a voltage divider,
   (e) diode means connecting one of the secondary windings in series with the set winding and one portion of the divider,
   (f) and additional diode means connecting the other secondary winding to the other portion of the divider in opposed relation.

4. In a comparator for an alternating voltage source,
   (a) a pair of saturable cores having set and reset windings,
   (b) a transformer having a primary winding energized from the source and having a plurality of pairs of secondary windings,
   (c) diode means connecting the reset windings to the source for energization in opposite senses,
   (d) a voltage divider having two adjacent portions,
   (e) additional diode means connecting each of one pair of secondary windings in series with one of the set windings and one portion of the divider,
   (f) and yet another diode means connecting each of another pair of secondary windings to the other portion of the divider in an opposite sense.

5. A half cycle comparator for an alternating voltage source comprising,
   (a) a pair of saturable cores having set and reset windings,
   (b) diode means connecting said reset windings to the source in opposite senses,
   (c) a voltage divider having two portions,
   (d) a transformer having a primary winding connected to the source and two pairs of secondary windings, one having a turns ratio of $kx$ primary turns and a second pair having a turns ratio of $(k-1)x$ primary turns where $k$ is larger than unity,
   (e) diode means connecting the secondary windings of the second pair to one portion of the divider in opposite senses,
   (f) and additional diode means connecting the secondary windings of the first pair one in series with each of the set windings across the other portion of the divider in opposite senses and in opposition to the second pair.

References Cited by the Examiner

UNITED STATES PATENTS

| | | | |
|---|---|---|---|
| 2,812,449 | 11/1957 | Spencer et al. | 307—88 |
| 2,888,645 | 5/1959 | Hoft et al. | 340—174 X |
| 2,967,294 | 1/1961 | Moerman | 340—140.2 |

ROBERT C. BAILEY, *Primary Examiner.*

MALCOLM A. MORRISON, *Examiner.*